United States Patent
Mies

(10) Patent No.: US 12,502,935 B2
(45) Date of Patent: Dec. 23, 2025

(54) WINDOW SEAL WITH VENTILATION FUNCTION

(71) Applicant: AUDI AG, Ingolstadt (DE)

(72) Inventor: Robert Mies, Stammham (DE)

(73) Assignee: AUDI AG, Ingolstadt (DE)

( * ) Notice: Subject to any disclaimer, the term of this patent is extended or adjusted under 35 U.S.C. 154(b) by 420 days.

(21) Appl. No.: 18/133,336

(22) Filed: Apr. 11, 2023

(65) Prior Publication Data

US 2023/0322047 A1  Oct. 12, 2023

(30) Foreign Application Priority Data

Apr. 12, 2022 (DE) .................... 10 2022 108 854.5

(51) Int. Cl.
| | | |
|---|---|---|
| *B60H 1/26* | (2006.01) | |
| *B60J 10/244* | (2016.01) | |
| *B60J 10/76* | (2016.01) | |

(52) U.S. Cl.
CPC ............ *B60H 1/267* (2013.01); *B60J 10/244* (2016.02); *B60J 10/76* (2016.02)

(58) Field of Classification Search
USPC .................................................. 454/69–165
See application file for complete search history.

(56) References Cited

U.S. PATENT DOCUMENTS

| | | | | |
|---|---|---|---|---|
| 4,761,917 A | * | 8/1988 | Knecht ................. | E06B 7/2318 49/490.1 |
| 4,870,783 A | | 10/1989 | Hermann et al. | |
| 4,989,369 A | * | 2/1991 | Maass ..................... | B60J 10/79 49/477.1 |
| 6,186,886 B1 | * | 2/2001 | Farrington ............. | B60H 1/248 454/75 |
| 6,282,911 B1 | * | 9/2001 | Watanabe .............. | B60H 1/245 296/214 |
| 2004/0176021 A1 | * | 9/2004 | Mills .................. | B60H 1/00792 454/143 |
| 2010/0170277 A1 | * | 7/2010 | Schmitt ............. | H05K 7/20745 165/104.34 |
| 2014/0273784 A1 | * | 9/2014 | Wade ..................... | B60H 1/248 454/162 |

FOREIGN PATENT DOCUMENTS

| | | |
|---|---|---|
| DE | 39 29 182 A1 | 4/1990 |
| DE | 41 19 704 A1 | 12/1992 |
| DE | 198 20 478 A1 | 11/1999 |
| GB | 2 355 278 A | 4/2001 |

* cited by examiner

*Primary Examiner* — Ko-Wei Lin
(74) *Attorney, Agent, or Firm* — Seed Intellectual Property Law Group LLP

(57) ABSTRACT

A window seal with ventilation function is provided and a method for the interior ventilation of motor vehicles is also provided.

10 Claims, 1 Drawing Sheet

WINDOW SEAL WITH VENTILATION FUNCTION

BACKGROUND

Technical Field

The present disclosure relates to a window seal with ventilation function and a method for the interior ventilation of motor vehicles.

Description of the Related Art

In order to seal off a height-adjustable window pane arranged in a motor vehicle door in water-tight manner in the area of the door sill, a lengthwise running seal is mounted on its inner and outer walls. This usually has projecting sealing lips, which lie with pretensioning against the surface of the window pane.

When the window is closed, the seal not only prevents water from getting into the interior, but also the exchange of air with the surroundings. Especially in the summer time, a parked vehicle can be intensely heated due to solar radiation, which then necessitates an increased air conditioning performance in order to lower the interior temperature to a pleasant level for the vehicle passengers.

From GB 2 355 278 A there is known a sealing and guiding arrangement for a movable vehicle side window, containing sealing means next to one side of the window pane which can be controlled to provide a first and a second configuration with different levels of sealing. The sealing means is defined by a hollow chamber with a flexible wall, making contact with the glass. The configuration of the chamber can be altered by controlling the air or gas pressure inside it, so that the degree of sealing so provided is changed. The sealing means forms part of a duct arranged around the circumference of a window opening. Control means are connected to the position of the window and the operation of the vehicle ignition and can also operate in response to rain or high-pressure water coming from the outside.

The document DE 39 29 182 A1 relates to a retention device for a motor vehicle door. A molding made of plastic or rubber for retention and sealing purposes is held in a duct running along the top side of the upper window frame piece, which is held by a customary vehicle door. The molding defines a hollow chamber running along the top side of the window opening, which in concert with a lip forms a duct in which the upper edge of the window pane is arranged. A wall is pressed against the window pane in sealing contact with it. The upper region of the molding defines hollow chambers. When the hollow chambers are at least partly evacuated, an intermediate spacing is created for opening the door.

The document DE 41 19 704 A1 discloses a door of a passenger car, having a seal running along the outer and inner walls of its door sill, being formed as a hollow profile and able to be activated by a device with pressure and partial vacuum. Pressurized air is introduced into the seals when the window pane is partly or fully raised, whereupon the walls of the seals at the pane side lie water-tight and sound-proof against the surfaces of the window pane. On the other hand, if this is shifted in height, the seals are subjected to a partial vacuum, so that their walls at the pane side move back from the surfaces of the window pane and this can then be changed in height with little effort.

BRIEF SUMMARY

Embodiments of the disclosure provide a method and a device with which a motor vehicle can be passively ventilated even with closed side window panes.

For instance, a method for ventilation and venting of the interior of a parked motor vehicle is provided, wherein the cross section of a window seal of at least one side window of the motor vehicle is decreased such that an air gap is formed between the window seal and a window pane of the side window, and at least one air inlet of the body of the motor vehicle situated beneath the at least one side window is opened, so that ambient air enters through the at least one air inlet into the interior of the motor vehicle and leaves the interior once more through the air gap.

A method according to an embodiment of the invention serves for the ventilation and venting of the interior of a parked motor vehicle. This means that the vehicle is not moving and the engine of the motor vehicle, especially the ventilation or air conditioning system of the motor vehicle, is not in operation. The method thus provides a passive ventilation and venting of the interior of the motor vehicle without the use of fans or blowers. The method generates, by a natural "chimney effect" an air flow from bottom to top through the motor vehicle, whereupon the incoming air becomes heated in the interior and thereby further intensifies the effect by thermics.

In the method, the cross section of a window seal of at least one side windows of the motor vehicle is decreased such that an air gap is formed between the window seal and a window pane of the side window.

The window seal comprises a cavity which can be filled or emptied. The cavity is filled with a gas, usually air.

When the motor vehicle is in operation, the window seal of the side window pane fully seals off the upper edge of the side pane and the internal pressure of the window seal corresponds to at least the atmospheric pressure prevailing in the surroundings. But the internal pressure can also be higher than the atmospheric pressure prevailing in the surroundings in order to press the seal more strongly against the side pane and thereby increase the sealing action and the soundproofing effect of the window seal.

In one embodiment of the method, the cross section of the window seal is decreased by reducing the volume of a cavity situated in the window seal. In another embodiment of the method, the volume of the cavity is reduced by decreasing the internal pressure in the cavity.

In one embodiment of the method, the cavity is evacuated by a pump. A partial vacuum is created in the cavity and the window seal is compressed by the atmospheric pressure.

In another embodiment of the method, the window seal is dimensioned such that an excess pressure must be generated in the cavity in order for the window seal to expand so that it fully seals off the upper edge of the side window pane. When the excess pressure is relaxed, the window seal shrinks and an air gap is formed between the window seal and the side pane.

In combination with the formation of the air gap, at least one air inlet of the body of the motor vehicle situated beneath the at least one side window is opened. In this way, surrounding air can get into the interior of the motor vehicle through the at least one air inlet and exit the interior once more through the air gap.

In one embodiment of the method, at least one air inlet of the body is situated in the floor region of the motor vehicle. In another embodiment of the method, at least one air inlet of the body is situated in a rear region of the motor vehicle.

In one embodiment of the method, the at least one air inlet of the body comprises a ventilation flap or a ventilation grill with movable fins. Thus, the air inlet can be opened and closed.

In one embodiment of the method, the at least one air inlet of the body is electrically activated. For example, a ventilation flap or the fins of a ventilation grill can be moved by electrically operated actuators.

Some embodiments are directed to a device for ventilation and venting of the interior of a parked motor vehicle. The device comprises at least one window seal arranged in a window frame of at least one side window of a motor vehicle, the cross section of which can be changed by changing the air pressure in a cavity enclosed by the window seal. Furthermore, the device comprises at least one air inlet of the body of the motor vehicle, situated beneath the at least one side window.

In one embodiment, the device also comprises a mechanism for changing the air pressure in the cavity enclosed by the window seal, such as a compressor or a vacuum pump, as well as valves for the ventilation or venting of the cavity.

In one embodiment, the device also comprises a mechanism for opening and closing the at least one air inlet of the body of the motor vehicle, such as electrically operated actuators. In one embodiment, the device also comprises a controller which is adapted to control the mechanism for changing the air pressure and the mechanism for opening and closing the at least one air inlet.

In one embodiment, the controller is adapted to open an air gap between the window pane and seal at one or more side windows and to open the at least one air inlet, when the motor vehicle is parked at a parking place; and to close the air gap(s) and air inlet(s) once again, when the motor vehicle is placed back in operation. In another embodiment, the controller is connected to a rain sensor and adapted to order the closing of air gap(s) and air inlet(s) when heavy rain occurs.

Embodiments of the invention ensure that the motor vehicle is not heated so much when parked in the sun. In this way, when the motor vehicle is placed in operation once again, less air conditioning performance is needed to cool the interior, which may be advantageous in the case of battery-operated electric vehicles (BEV), since the battery charge is spared and the range is not decreased so much. Embodiments can also save energy in the case of hybrid vehicles (PHEV) or vehicles with combustion engines, thereby lowering the fuel consumption.

Unlike an opened side window, there is no danger of gaining unauthorized access to the interior of the vehicle through the air gap. Neither can water get into the interior through the air gap during a rain shower.

Embodiments of the methods described herein can be carried out automatically when the motor vehicle is stationed at a parking place. During the parked time, no energy outlay is needed for the ventilation and venting of the vehicle interior, since an air flow through the vehicle interior is created by the thermics.

Further benefits and embodiments will emerge from the specification and the accompanying drawings.

Of course, the features mentioned above and those yet to be explained in the following can be used not only in the particular indicated combination, but also in other combinations or standing alone, without leaving the scope of the present disclosure.

BRIEF DESCRIPTION OF THE SEVERAL VIEWS OF THE DRAWINGS

Embodiments are represented schematically with the aid of the drawings and shall be further specified with reference to the drawings.

DETAILED DESCRIPTION

Figure 1:
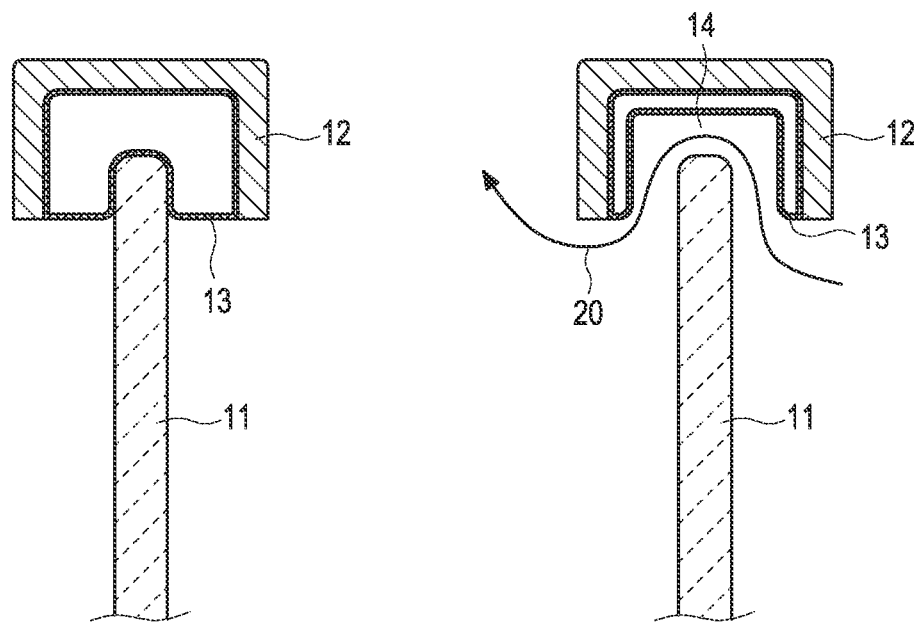
FIG. 1 shows a schematic representation of a vehicle side window with a seal whose internal pressure can be regulated.

FIG. 1 shows schematically a vehicle side window 11 having a seal 13 whose internal pressure can be regulated. The seal 13 is arranged in a window frame 12. The seal 13 has a cavity, and the internal pressure of the seal 13 can be regulated by a device not shown in the drawing, such as a pump.

At the left side of the drawing, the side window pane 11 is represented in its upper end position, i.e., with the side window closed. The seal 13 has an internal pressure, corresponding at least to the atmospheric pressure prevailing in the surroundings, and it fully seals off the upper edge of the side window pane 11. The internal pressure of the seal 13 can also be higher than the atmospheric pressure prevailing in the surroundings, in order to press the seal 13 more strongly against the side pane 11 and thereby increase the sealing action and the soundproofing effect of the seal 13.

At the right side of the drawing, the side pane 11 is likewise represented in its upper end position, i.e., with the side window closed. However, the internal pressure of the seal 13 is decreased as compared to the atmospheric pressure prevailing in the surroundings, so that the seal 13 is compressed by the atmospheric pressure. The seal 13 of the side pane 11 can be evacuated, for example, by a vacuum pump (not shown). Thanks to the evacuating, an air gap 14 is formed, through which an air flow 20 can be formed between the interior and the surroundings in order to bring about a temperature equalization.

Figure 2:
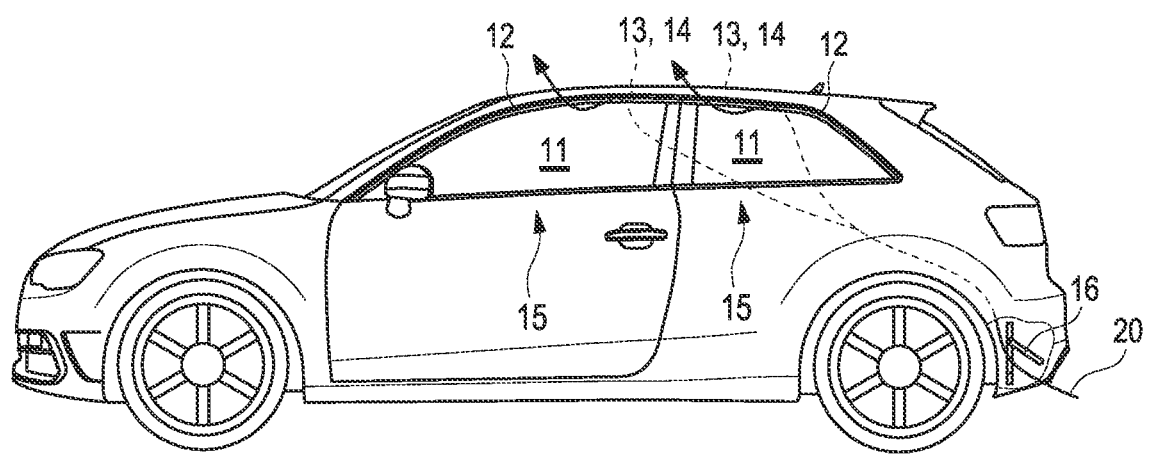
FIG. 2 shows a schematic representation of a motor vehicle with one embodiment of the ventilation device.

FIG. 2 shows schematically a motor vehicle 10 with one embodiment of the ventilation device described herein in action. The window panes 11 of the side window 15 are in their upper end position, and thus the side windows 15 are closed. The window seals 13 of the side panes 11 are evacuated and an electrically opening interior venting 16 (ventilation flap or ventilation grill) in the rear of the motor vehicle 10 is opened. Through the opened ventilation flap 16, an air flow 20 from the outside can get into the motor vehicle 10 and leave once more through the air gaps 14. Thanks to the chimney effect, which is intensified by the heated air in the interior, the air flow 20 moves from bottom to top through the motor vehicle 10 and carries heat away from the vehicle interior.

German patent application no. 10 2022 108854.5, filed Apr. 12, 2022, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for ventilation and venting of an interior of a motor vehicle that is parked, the method comprising:
   decreasing a cross section of a window seal of at least one side window of the motor vehicle while a window pane of the at least one side window remains static such that an air gap that enables fluid communication between the interior of the motor vehicle and an environment external to the motor vehicle is formed between the window seal and the window pane of the at least one side window; and
   opening at least one air inlet of a body of the motor vehicle situated beneath the at least one side window so that ambient air enters through the at least one air inlet into the interior of the motor vehicle and leaves the interior through the air gap to the environment external to the motor vehicle.

2. The method according to claim 1, wherein the cross section of the window seal is decreased by reducing a volume of a cavity situated in the window seal.

3. The method according to claim 2, wherein the volume of the cavity is reduced by decreasing an internal pressure in the cavity.

4. The method according to claim 3, wherein the cavity is evacuated by a pump.

5. The method according to claim 1, wherein the at least one air inlet of the body is situated in a floor region of the motor vehicle.

6. The method according to claim 1, wherein the at least one air inlet of the body is situated in a rear region of the motor vehicle.

7. The method according to claim 1, wherein the at least one air inlet of the body comprises a ventilation flap or a ventilation grill with movable fins.

8. The method according to claim 1, wherein the at least one air inlet of the body is electrically activated.

9. A device for ventilation and venting of an interior of a motor vehicle that is parked, the device comprising:
   at least one window seal arranged in a window frame of at least one side window of the motor vehicle, wherein the at least one window seal is configured such that a cross section of the at least one window seal can be changed by changing an air pressure in a cavity enclosed by the at least one window seal to from an air gap between the at least one window seal and a window pane of the at least one side window that enables fluid communication between the interior of the motor vehicle and an environment external to the motor vehicle; and
   at least one air inlet of a body of the motor vehicle, which is situated beneath the at least one side window and operable to allow ambient air to enter through the at least one air inlet into the interior of the motor vehicle and leave the interior through the air gap to the environment external to the motor vehicle.

10. The device according to claim 9, further comprising:
    a mechanism for changing the air pressure in the cavity enclosed by the window seal;
    a mechanism for opening and closing the at least one air inlet of the body of the motor vehicle; and
    a controller which is adapted to control the mechanism for changing the air pressure and the mechanism for opening and closing the at least one air inlet.

* * * * *